United States Patent [19]

Walter

[11] Patent Number: 4,610,358

[45] Date of Patent: Sep. 9, 1986

[54] TELESCOPING CONTAINER ASSEMBLY

[76] Inventor: Thomas H. Walter, 12 Water St., B-4, Mystic, Conn. 06355

[21] Appl. No.: 657,578

[22] Filed: Oct. 4, 1984

[51] Int. Cl.$^4$ .................. B65D 21/02; B65D 33/30; B65D 33/18
[52] U.S. Cl. .................. 206/514; 220/407; 383/31; 383/91; 383/95; 383/905
[58] Field of Search ............ 206/514; 383/32, 91, 383/93, 95, 905; 220/407

[56] References Cited

U.S. PATENT DOCUMENTS

| | | | |
|---|---|---|---|
| 109,739 | 11/1870 | Hantly | 206/514 |
| 2,071,745 | 2/1937 | Higginbottom | 383/91 |
| 2,324,440 | 7/1943 | Tormohlen | 220/407 |
| 3,143,278 | 8/1964 | Hiebert | 383/93 |
| 3,545,668 | 12/1970 | Hultberg | 383/905 |
| 3,578,236 | 5/1971 | Arai | 383/905 |
| 3,589,595 | 6/1971 | White | 383/905 |
| 3,784,087 | 1/1974 | Styers | 383/905 |
| 4,301,925 | 11/1981 | Bogart | 383/905 |

FOREIGN PATENT DOCUMENTS 1271791 4/1972 United Kingdom ............... 220/407

Primary Examiner—George E. Lowrance

[57] ABSTRACT

An assembly of disposable biodegradable containers has smaller containers of the assembly telescopingly housed within next larger containers of the assembly where each container includes a body and a closeable reopenable closure at an end of the body including a cap joined to the body where the cap extends longitudinally from the body to an aperture, where the cap includes a pair of longitudinally extending opposite V-shaped flexible folding hinge portions whereby when the longitudinally extending exterior surfaces of the cap which are subtended by the V-shaped hinge portions are urged towards one another, interior surfaces of the cap bounded by edges of aperture contact thereby closing the aperture and including a contact adhesive for releasably maintaining the cap closed by securing contacting interior surfaces of the cap and including a deformable strip for retaining the container closed upon wrapping strip end portions about the cap has been folded about the strip.

20 Claims, 10 Drawing Figures

TELESCOPING CONTAINER ASSEMBLY

BACKGROUND OF THE INVENTION

1. Field of the Invention

This invention relates to containers for collection and transport of refuse such as garbage or trash.

2. Description of the Prior Art

Garbage cans and bags are known and used to collect refuse of all kinds. Generally garbage cans and bags have been constructed of metal, paper or plastic.

Closures for containers such as bags are also known, being disclosed in U.S. Pat. Nos. 2,991,001; 3,143,278; 3,439,866; 3,545,668; 3,669,254; 3,784,087; 3.865.304 and 3,990,627.

The '087, '304 and '668 patents disclose a deformable metal strip at the upper periphery of a container, to hold a folded upper portion of the container mouth in place once the container mouth has been closed by folding. The strip extends beyond the edges of the container to permit folding of the deformable metal strip over itsself, to hold the folded portion of the container in place.

'278 discloses adhesive at the interior of a mouth of a container to seal the container closed.

OBJECTS OF THE INVENTION

It is a principal object of this invention to provide an assembly of disposable substantially biodegradable containers having a successively next smaller container of the assembly telescopingly housed within a successively next larger container of the assembly, for serial individual use and removal of the containers from the assembly beginning with the most interior and therefore smallest container of the assembly.

It is a further object of this invention to provide such an assembly of containers in which each container has a closeable, reopenable closure at a mouth end of the container.

It is a further object of this invention to provide a telescoping assembly of such containers where the containers are substantially biodegradable to permit dissolution thereof into natural components without hazard or disfigurement of the environment.

SUMMARY OF THE INVENTION

This invention provides an assembly of disposable substantially biodegradable containers, having a successively next smaller container of the assembly telescopingly housed within a successively next larger container of the assembly, for serial individual use and removal of containers from the assembly beginning with the most interior and therefore smallest container of the assembly, where each container includes a longitudinally elongated body having a base end and a mouth end opposite the base end and a closeable, reopenable closure at the mouth end of the container.

The closeable reopenable closure preferably includes a biodegradable longitudinally elongated hollow cap portion continuously joining the mouth end of the body to define a continuous joint between the cap and body portions of each container. Each cap portion preferably extends longitudinally from the joint to an aperture defining an open end of the cap portion remote from juncture of the cap and body portions. further preferably includes folding hinge portions extending oppositely one from another in general V shapes, with the vertices of the Vs at midpoints of opposite sides of the aperture. The flexible hinge portions are configured so that when longitudinally extending surfaces of the cap subtended by the V shaped hinge portions are urged towards each other to positions at which they are more perpendicular than parallel with respect to the longitudinal axis of the container, interior surfaces of the cap bounded by opposing edges of the aperture contact, thereby closing the aperture.

The closure preferably includes contact adhesive means on the interior surfaces of the cap about the aperture, for releasably maintaining the cap portion closed by securing the contacting interior surfaces of the cap.

The closure preferably further includes deformable strip means secured to the cap generally parallel with and extending past both ends of one of the edges of the aperture, edges for retaining the container closed upon wrapping strip end portions about a portion of the cap after the aperture has been closed by contacting the interior surfaces of the cap and thereafter folding the portion of the cap adjacent to the edges which defined the aperture prior to contact of the respective interior surfaces, at least one time, transverse to the longitudinal axis, about the strip and towards the longitudinally elongated body of the container.

DESCRIPTION OF THE PREFERRED EMBODIMENTS AND BEST MODE CONTEMPLATED FOR PRACTICING THE INVENTION

Figure 1:
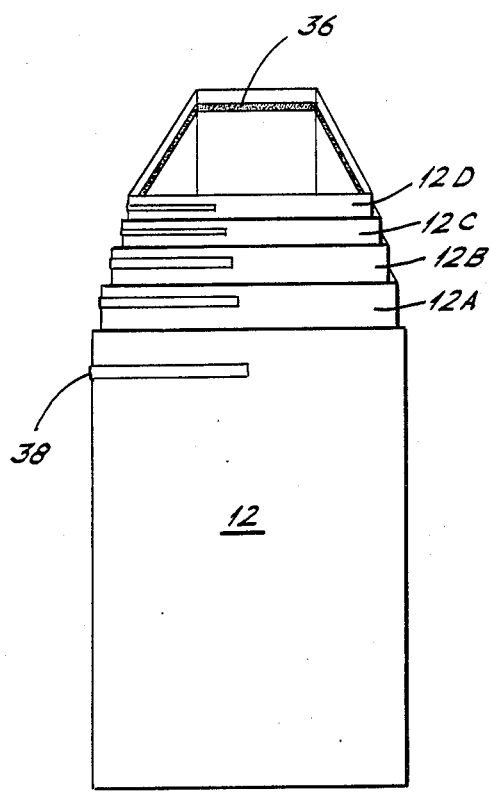
FIG. 1 is a schematic perspective view of an assembly of disposable closeable containers manifesting one embodiment of the invention.

In FIG. 1 an assembly of disposable closeable substantially biodegradable containers of the invention is designated generally 10 with individual containers of the assembly designated 12, 12A, 12B, etc. As easily seen in FIG. 1, the containers 12, 12A, etc. telescopingly fit together with successively next smaller containers of assembly 10 housed within successively next larger containers of the assembly where container 12A, being the successively next smaller container with respect to container 12 is housed within container 12, where container 12B, being the successively next smaller container with respect to container 12A, is housed within container 12A, etc. This telescoping assembly permits serial individual use and removal of containers 12, 12A, 12B from assembly 10, preferably beginning with the most interior and therefore smallest container of the assembly which would be container 12D as illustrated in FIG. 1.

Each container includes a manually operated closure portion which when actuated provides first and second seals separating the container contents from ambient air. The closure portion is described in greater detail below.

Figure 2:
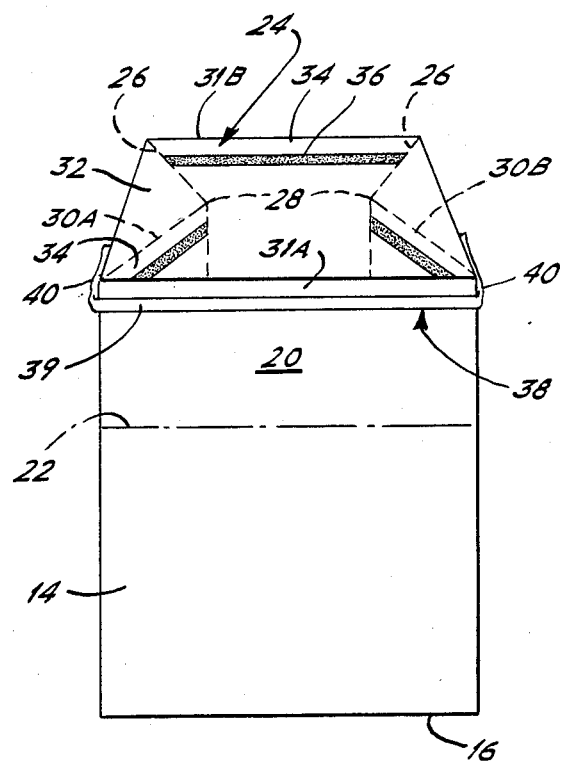
FIG. 2 is a perspective view of one of the containers illustrated in FIG. 1 rotated 90° from the position illustrated in FIG. 1, illustrating operation of the closure portion of the container.
Figure 3:
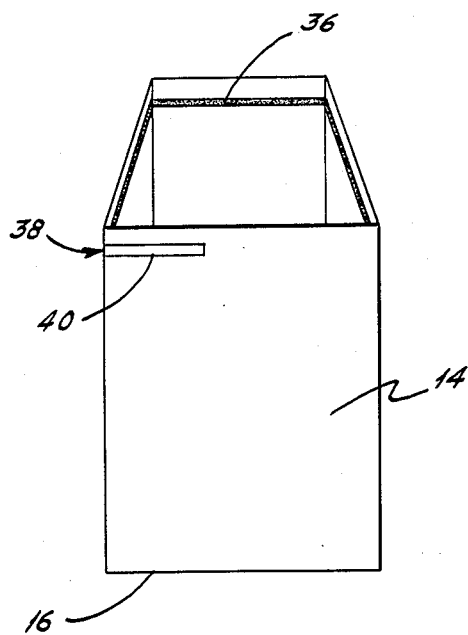
FIG. 3 is a schematic perspective view of one of the containers illustrated in FIG. 1.
Figure 4:
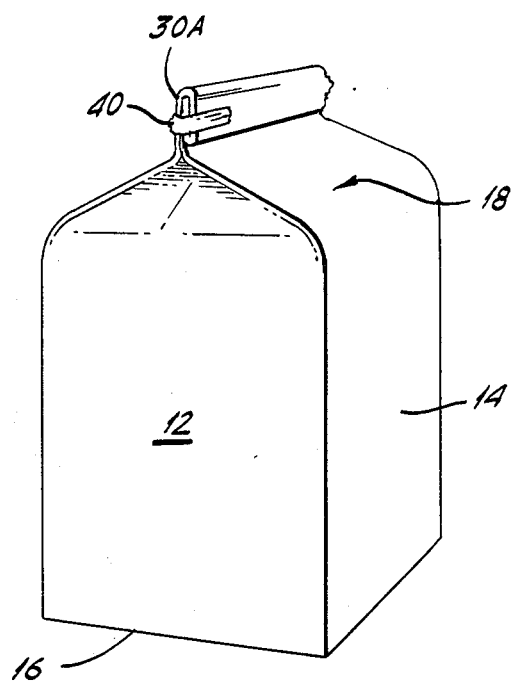
FIG. 4 is a perspective view of a container illustrated in FIGS. 1, 2 and 3, with the closure portion of the container depicted in the closed position.

Referring to FIGS. 2 through 4 and particularly FIG. 2, each container 12, 12A, 12B, etc. includes a longitudinally elongated rigid hollow preferably parallelepiped paperboard body 14, having a closed base 16 and an open mouth opposite the base, and where the open mouth is not numbered. The container further includes a closeable reopenable closure designated generally 18 at the mouth end of the elongated parallelepiped body where closure 18 includes a longitudinally elongated foldable cap portion 20 continuously joining the the mouth end of the body 14 about the periphery thereof, to define a continuous joint 22 indicated by a dotted line in FIG. 2. It is to be understood that body portion 14 and cap portion 20 may be manufactured of a single piece of suitable paperboard or other type of biodegrading material and that it is not necessary that continuous joint 22 represent a juncture resulting from fabrication of two previous separate pieces, namely a separate cap portion 20 and a separate body portion 14.

Cap portion 20 extends longitudinally from joint 22 to form a generally rectangular aperture, designated generally 24 in FIG. 2, which is generally transverse to and symmetrically disposed about the longitudinal axis of the container, which would be represented by vertical line if drawn in FIG. 2. Aperture 24 defines an open end of the cap portion 20 remote from peripheral joint 22.

Cap portion 20 includes a pair of flexible folding hinge portions 26 extending on opposite sides of cap portion 20 in "V" shapes, as illustrated in FIG. 2. Vertices 28 of the Vs are located at midpoints of respective opposite sides 30A, 30B of the rectangular aperture. Legs of the V shapes extend downwardly toward but preferably stop short of peripheral joint 22. Each of the respective Vs subtend longitudinally extending surfaces of cap 20 where the longitudinally extending surfaces are designated 32 in FIG. 2.

Hinge portions 26 may be perforate or may be defined by a weakening line, such as by scribing, to facilitate folding of the hinge portions along the dotted lines illustrated in FIG. 2. The dotted lines 26 extending to the corners of the parallelpiped shape defining the cap in FIG. 2 indicate the hinge portion after some folding has been performed. The two solid straight lines connecting the extremities of respective legs of a single V in FIG. 2 indicate the hinge portions before any folding has been performed. The unnumbered vertically dotted lines extending downwards from the vertices of the respective Vs in FIG. 2 are fold lines, showing where portions of cap 20 fold when the closure is activated. This construction of hinge portions 26 permits longitudinally extending portions 32 of cap 20 to be urged towards each other, as illustrated in FIG. 2, towards the longitudinal axis of the container, to positions at which surfaces 32 are more perpendicular than parallel with respect to the longitudinal axis of the cap portion and hence of the container.

Cap portion 20 includes interior strip surfaces 34 which are bounded on one edge by the edge of the cap portion defining aperture 24.

In the embodiment illustrated in FIG. 2, before longitudinally extending surface portions 32 are urged towards one another, aperture 24 is defined by respective opposite edge surfaces 30A, 30B and 31A, 31B. Each edge 30A, 30B, 31A, 31B bounds an interior surface strip portion 34. When longitudinally extending portions 32 are urged towards each other, edges 30A and 30B bend at the vertices 28 of respective Vs, along straight lines 26 as substantially illustrated in FIG. 2 while edges 31A and 31B remain straight. As longitudinally extending portions 32 are further urged into positions in which they are more perpendicular than parallel to the longitudinal axis of the container, respective edges 30A and 30B move towards one another, as do respective edges 31A and 31B. This converging movement continues until aperture 24 is closed by contact of respective interior surface strip portions 34 associated with edges 30A, 30B, 31A and 31B. Depending upon the relative lengths of parallel sides 30A, 30B and 31A, 31B, interior surface strip portions 34 associated with the opposed parallel edges 31A, 31B may contact each other over a portion of their length or may be entirely separated from each other and in contact with interior strip surface portions 34 associated with opposite sides 30A and 30B, which include vertices 28 of the two folding hinge portions 26.

Each interior strip surface portion 34 preferably includes contact adhesive means 36 for releasably maintaining the cap portion closed, and thereby defining a first seal of the container when the cap portion is closed, by securing together respective contacting interior strip surface portions 34 associated with surfaces 30A, 30B and 31A, 31B. Contact adhesive means 36 may be located immediately adjacent edges 30A, 30B, 31A, 31B or may be slightly axially displaced therefrom, as illustrated in FIG. 2. Preferably a peel strip is provided covering contact adhesive means 36 for each container and is removed from the container before the closure is closed. Such a peel strip prevents the telescoping containers from sticking together, due to contact with the adhesive means within each of the successive smaller containers. Contact adhesive means 36 is also illustrated in FIGS. 1 and 3.

Further provided with each container is a deformable, preferably metal band, or strip 38 having a central portion 39 secured to the exterior of cap 20 in a position preferably parallel with one of edges 31A, 31B as illustrated in FIG. 2. Suitable adhesive may be used to secure the head in place. The band preferably extends past both ends of the parallel edge to which the band is adjacently mounted. The aperture edge 31A or 31B defining an extremity of the side of the container to which central portion 39 of band 38 is mounted separates the aperture edges which contain the vertices of the Vs. This is shown as edge 31A separating edges 30A, 30B in FIG. 2. End portions 40 of band 38 extend around corners of parallelepiped shaped cap 20 and are in facing contact with, but not secured to, the surfaces of parallelepiped shaped cap 20 which terminate in edges 30A, 30B. Band 38 retains container 12 closed when the deformable band end portions 40 are wrapped around a portion of the cap, after the aperture has been closed by contacting respective interior strip surface portions 34 and associated contact adhesive means 36 by urging longitudinally extending portions 32 from their positions parallel with the longitudinal axis of the container to positions more perpendicular to the longitudinal axis of the container.

Once the respective interior strip surface portions 34 and their associated contact adhesive means 36' have been secured together and the portion of the cap adjacent edges 30A, 30B, 31A, 31B, which defined the aperture 24 prior to contact of strip portions 34, has been folded at least one time transversely to the longitudinal axis, about central portion 39 of band 38 and towards body portion 14 of the container, end portions 40 of band 38 may be wrapped around this folded portion of the cap as illustrated in FIG. 4 thereby retaining the cap in the folded, sealed disposition.

Folding the portion of cap 20 adjacent aperture 24 over central portion 39 of band 38 produces a second seal, isolating contents of container 12 from ambient air. The first seal is provided, of course, by contact of adhesive means 36, associated with respective interior strip surface portions 34, with adhesive means 36 associated with oppositely facing, correspondingly respective interim strip portion 34, when longitudinally extending portions 32 are urged towards one another.

As best seen in FIG. 4, once folding is complete and the deformable end portions 40 of band means 38 have been bent to position, the folded cap portion provides a convenient, handle-like member for lifting and carrying the container 12.

It is to be understood that edges 30A, 30B should be, at most, as long as edges 31A, 31B. Edges 30A, 30B can, of course, be shorter than edges 31A, 31B so long as edges 30A, 30B are long enough to provide adequately large longitudinally extending portion 32' and reasonably facile bending of hinge portions 26 in response to manually applied force. If edges 30A, 30B are as long as edges 31A, 31B, when manual force is applied to longitudinally extending portions 32 thereby folding flexible folding hinge portions 26, the respective interior strip surface portions 34 associated with edges 31A, 31B will not contact each other but will contact interior strip surface portions 34 associated with edges 30A, 30B. However, if edges 30A, 30B are shorter than edges 31A, 31B, respective interior strip surface portions 34 associated with edges 31A, 31B will contact each other, at least in the area of the midpoint of edges 31A, 31B, with the amount of contact increasing as edges 30A, 30B are reduced in length from those of 31A, 31B.

An alternate but equally preferable embodiment of the invention is illustrated in FIGS. 5 through 10, in which the body and cap portions of the container have generally circular cross-sections where body portions 14' is a longitudinally tapered biodegradable preferably rigid hollow cylindrical paperboard body having smaller diameter at its closed base end 16 and a larger diameter at a circular mouth end at which the body joins to a recloseable closure designated generally 18'. (Functionally equivalent structure in the two embodiments are designated with the same numbers. Presence or absence of prime notion denotes the different embodiments.) Cap portion 18', similarly to cap portion 18, continuously joins a circular mouth end of the cylindrical body about the circumference thereof to define a continuous circular joint 22' therebetween, best illustrated in FIGS. 7 and 8.

The containers in the second embodiment have not been illustrated in the telescoping configuration but it is to be understood that they may be so-positioned, in a group, similarly to the containers illustrated in FIG. 1. The longitudinally tapered shape of the body and cap portions of the container in the second embodiment, particularly as illustrated in FIG. 7, greatly facilitates such telescoping packing of the containers into a single assembly.

As with the containers of the first embodiment, the containers illustrated in FIGS. 5 through 10 each include a manually operated closure portion which when actuated provides first and second seals separating the container contents from ambient air.

Figure 6:
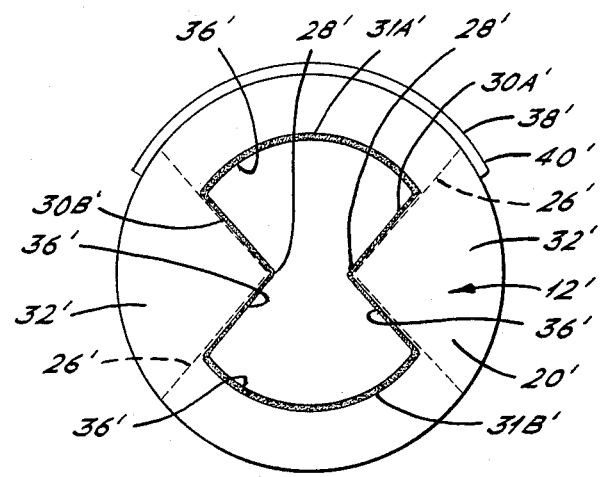
FIG. 6 is a top view of the container illustrated in FIG. 5.
Figure 7:
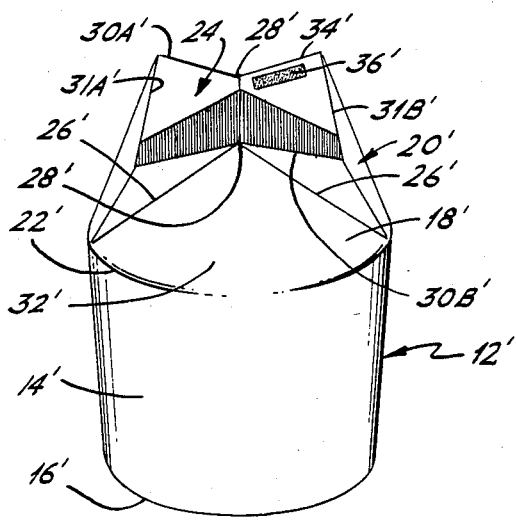
FIG. 7 is a schematic perspective view of the container illustrated in FIGS. 5 and 6, illustrating operation of the closure portion of the container.

Referring to FIGS. 6 through 10 and particularly FIGS. 6 and 7, each container 12' includes a cap portion 20' extending longitudinally away from circular joint 22' to form a generally rectangular aperture, designated generally 24 in FIG. 7 which is generally transverse to and symmetrically disposed about the longitudinal axis of the container. Aperture 24 defines an open end of cap portion 20' remote from peripheral joint 22'.

Cap portion 20' includes a pair of flexible folding hinge portions 26' extending on opposite sides of cap portion 20' in "cap V" shapes, as illustrated in FIGS. 6 and 7. Vertices 28' of the Vs are located preferably at midpoints of respective opposite sides 30A', 30B' of the retangular aperture. Legs of the V shapes extend downwardly towards peripheral joint 22 and may contact peripheral joint 22' as illustrated in FIG. 7. Each of the respective Vs subtend the longitudinally extending surfaces of 20' where the longitudinally extending surfaces are designated 32' in FIGS. 6, 7 and 8.

Figure 5:
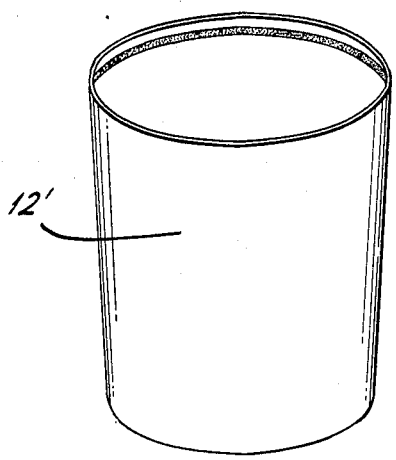
FIG. 5 is a perspective view of a container manifesting a second embodiment of the invention.

As with the embodiment illustrated in FIGS. 1 through 4, hinge portions 26' may be perforate or may be defined by weakening lines, for example lines created by scribing, to facilitate folding of the hinge portions along the dotted lines illustrated in FIG. 6 and the solid lines illustrated in FIG. 7. The dotted lines 26' in FIG. 6 and the solid lines 26' in FIG. 7 indicates the hinge portions after some folding has been performed. It is to be understood that prior to any folding, the container preferably appears as illustrated in FIG. 5 and that upon application of manual force to longitudinally extending portions of the container subtended by the V shaped hinge portions 26, the folding occurs as illustrated in FIGS. 6 and 7. This construction of hinge portions 26' permits longitudinally portions 32' of cap 20' to be urged towards each other, as illustrated in FIG. 7, towards the longitudinal axis of the container, to positions at which surfaces 32' are more perpendicular than parallel with respect to the longitudinal axis of the cap portion and hence of the container.

Cap portion 20', similarly to cap portion 20 illustrated in FIGS. 1 through 4, includes interior strip surface portions 34' bounded on one edge by the respective edge of the cap portion defining aperture 24. Only one interior strip surface portion 34 has been illustrated in FIGS. 5 through 10, that appearing in FIG. 7, in order to aid the clarity of the drawings.

As for the embodiments illustrated in FIGS. 1 through 4, in the embodiments illustrated in FIGS. 5 through 10, before longitudinally extending surface portions 32' are urged towards one another, aperture 24 is defined by respective opposite edge surfaces 30A', 30B' and 31A', 31B'. Similarly to the embodiments illustrated in FIGS. 1 through 4, each edge 30A', 30B', 31A', 31B' bounds an interior surface strip portion 34.

When longitudinally extending portions 32' are urged towards one another, edges 30A' and 30B' bend at the vertice 28' of respective Vs, along straight lines 26' as substantially illustrated in FIGS. 6 and 7, while edges 31A' and 31B' may curve only slightly, as illustrated in FIG. 6, depending on the size of aperture 24 relative to the juncture of cap and body portions and the distance from aperture 24 to juncture of the cap and body portions of the container. As longitudinally extending portions 32' are further urged into positions in which they are more perpendicular than parallel to the longitudinal axis of the container, respective edges 30A' and 30B' move towards one another, as do respective edges 31A' and 31B'. This converging movement continues until aperture 24 is closed by contact of respective interior surface strip portions 34' associated with edges 30A', 30B', 31A' and 31B'. Depending on the relative lengths of sides or edges 30A', 30B' and 31A', 31B' defining aperture 24, interior surface strip portions 34 associated with opposed edges 31A', 31B' may contact each other over a portion of their length or may be entirely separated from each other and in contact with interior strip surface portions 34' associated with opposite sides 30A' and 30B', which include vertices 28 of the two folding hinge portions 26'.

As with the embodiment illustrated in FIGS. 1 through 4, each interior strip surface portion 34' preferably includes contact adhesive means 36' for releasably maintaining the cap portion closed, and thereby defining a first seal of the container when the cap portion is closed, by securing together respective contacting interior strip surface portions 34 associated with surfaces 30A', 30B' and 31A', 31B'. Contact adhesive means 36 may be located immediately adjacent to edges 30A', 31B', 31A', 31B' or may be slightly axially displaced therefrom, as illustrated in FIG. 7. Preferably a peel strip is provided covering contact adhesive means 36 for each container and is removed from the container before the closure is closed. Such a peel strip prevents the telescoping containers from sticking together, due to contact with the adhesive means within each of the successive smaller containers when the containers are nested or telescoped together as generally illustrated in FIG. 1. Further provided with each container is a deformable, preferably metal, band or strip 38' secured at its central portion to the exterior of cap 20' in a manner preferably parallel with one of edges 31A', 31B' as illustrated in FIG. 6. Suitable adhesive may be used to secure band 38' in place. Band 38' preferably extends past the positions at which the lines defining flexible folding hinge portions 26 intersect the exterior surface of the container cap to which band 38' is secured. This is best illustrated in FIG. 6. The portions of band 38 which extend beyond the lines defining hinge portions 26' are end portions of band 38', denoted 40' in FIG. 6.

The aperture edges 31A' or 31B' defining an extremity of the portion of the container to which band 38 is secured separate the aperture edges which 30A', 30B' which contain a vertices 28' of the Vs. This is shown as edges 31A' separating edges 30A', 30B' in FIG. 6. It is to be understood that the end portions 40' of band 38' extending past the extremities of the lines defining hinge portions 26' are not permanently secured to the container cap but are preferably only in facing contact therewith.

Band 38' retains container 12' closed when the deformable band end portions 40' are wrapped around a portion of the cap, after the aperture has been closed by contacting respective interior strip surface portions 34' and associated contacting adhesive means 36' by urging the longitudinally extending generally pie shaped portions 32 from their positions parallel with the longitudinal axis of container to positions more perpendicular to the longitudinal axis of the container.

Figure 8:
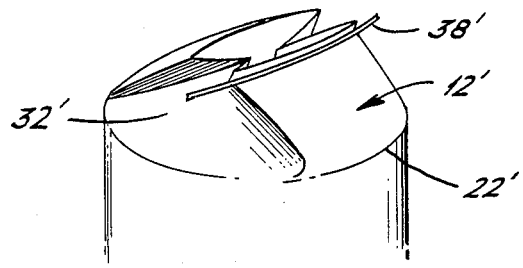
FIG. 8 is a broken schematic perspective view of the container illustrated in FIGS. 5, 6 and 7, illustrating further operation of the closure portion of the container.
Figure 9:
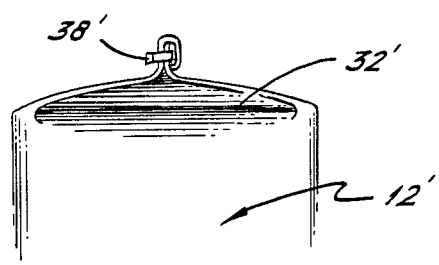
FIG. 9 is a broken side view of the container illustrated in FIGS. 5, 6, 7 and 8, illustrating the closure portion of the container in its closed position.
Figure 10:
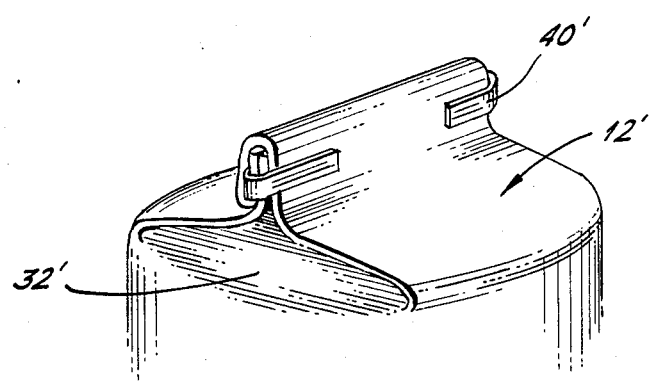
FIG. 10 is an enlarged broken perspective view of the container illustrated in FIGS. 5, 6, 7, 8, and 9, depicting the closure portion of the container closed, as illustrated in FIG. 9.

Once the respective interior strip surface portions 34' and their associated contact adhesive means 36' have been secured and the portion of the cap adjacent edges 30A', 30B', 31A', 31B', which defined aperture 24 prior to contact of strip surface portions 34', has been folded at least one time transversely to the longitudinal axis, about a central portion of band 38 and towards body portion 14' of the container, end portions 40' of the band 38' may be wrapped around this folded portion of the cap as illustrated in FIGS. 9 and 10, thereby retaining the cap in folded, sealed disposition. FIG. 8 illustrates the cap just prior to closure of aperture 24 and subsequent folding of the cap portion about band 38'.

Folding the portion of cap 20 prime adjacent aperture 24 over band 38' produces a second seal, isolating the contents of container 12 from ambient air. The first seal is provided, of course, by contact of adhesive means 36', associated with respective interior strip surface portions 34', with adhesive means 36 associated with oppositely facing, corresponding respective interior strip portions 34', when longitudinally extending pie shaped portions 32' are urged towards one another.

As best seen in FIGS. 9 and 10, once folding is complete and the deformable portions 40' of band means 38' have been bent to position, the folded cap portion provides a convenient, handle-like member for lifting and carrying the container 12'.

It is to be understood that edges 30A', 30B' should be, at most, as long as edges 30A', 31B'. Edges 30A', 30B' can, of course, be shorter than edges 31A', 31B' so long as edges 30A', 30B' are long enough to provide adequately large longitudinally extending pie shaped portions 32' and reasonably facile bending of hinge portions 26' in response to manually applied force. If edges 30A', 30B' are as long as edges 31A', 31B', when manual force is applied to longitudinally extending pie shaped portions 32' thereby folding flexible folding hinge portions 26', respective interior strip surface portions 34' associated with edges 31A', 31B' will not contact each other but will contact interior strip surface portions 34' associated with edges 30A', 30B'. However, if edges 30A', 30B' are shorter than edges 31A', 31B', respective interior strip surface portions 34' associated with edges 31A', 31B' will contact each other, at least in the area of the midpoint of edges 31A', 31B', with the amount of contact increasing as edges 30A', 30B' are reduced in length from those of 31A', 31B'. Of course, if edges 30A', 30B' are longer than edges 31A', 31B', some overlap between edges 30A' and 30B' will be necessary to close the container; this is also the case with the containers illustrated in FIGS. 1 through 4.

While it is to be understood that the invention is intended principally for receiving refuse, it is not so limited in use. !loreover, while the invention has been disclosed and described as a series of containers of rectangular or circular cross-section, it is to be understood that any suitable geometric configuration, such as an oval or a square may be utilized. The containers of the invention may be constructed of paper or paper-like components or derivatives thereof which, when treated chemically, are preferably biodegradable, water resistant and flame resistant, at least below a specific temperature. The containers may also be impregnated with a pleasant aromatic substance to counteract noxious odors commonly associated with refuse.

Typically the containers of an assembly of the invention are used serially, that is one at a time, with the most interior container being used first. Once the most interior container has been filled, this container is removed from the assembly, leaving the adjacent containers undisturbed. The containers may be fashionably designed with assorted colors, patterns, logos, famous faces and historical events, phrases, athletic events and personalities shown thereon. Of course different designs may be used on each container so that a new design appears when each container is removed from the assembly. This may provide a pleasing feature for children especially.

A common lid or top may be provided for all of the containers. The top may preferably not be biodegradable so that it can be used with subsequently purchased assemblies of containers.

The major advantage provided by the invention is the elimination of the necessity for the use of trash bags and the like in conjunction with more permanent, heavy duty garbage cans and trash receptacles. The disposability of the present invention means that once a container of the invention has been filled and sealed, the entire container including its contents can be discarded.

I claim:

1. An assembly of individual disposable closeable, reopenable and recloseable double sealed biodegradable containers, having successively next smaller containers of said assembly telescopingly housed within successively next larger containers of said assembly for serial individual use and removal of said containers from said assembly beginning with the most interior and therefore smallest container of said assembly, a closure portion of each container when actuated having first and second serially disposed seals separating the container contents from ambient air, each container comprising:

1. a longitudinally elongated biodegradable rigid hollow body including a closed base end and an open mouth end opposite said base end;
2. a closeable, reopenable and recloseable closure at said mouth end of said elongated body, comprising:
   a. a biodegradable longitudinally elongated foldable hollow cap portion continuously joining said mouth end of said body about the periphery thereof to define a continuous joint therebetween;
   b. said cap portion extending longitudinally from said joint to define an aperture generally transverse to the longitudinal axis of said container, said aperture defining an open end of said cap portion remote said continous joint when said first and second seals are inoperative;
   c. said cap portion including pairs of flexible folding hinge portions extending on opposite sides of said cap portion in isoceles triangular V-shapes having their triangular bases defined by cap-body juncture with vertices of said Vs at substantially said aperture, said flexible folding hinge portions being defined by weakening lines formed in said cap portion for folding of said cap portion therealong including along the legs of said "V", legs of said V-shapes longitudinally extending substantially to said joint, said longitudinally extending oppositely opposed surfaces of said cap defined by said V-shaped flexible hinge portions being foldable at juncture thereof with said body by application of hand pressure to external surfaces thereof inwardly towards each other until reaching positions at which the entire interior surface of said cap bounded by said aperture contacts itself and closes said aperture;
   d. pressure sensitive adhesive strip means extending circumferentially completely about said interior surfaces of said cap proximate said aperture, for releasably maintaining said cap portion closed and thereby defining said first seal by securing together said contacting entire interior surface of said cap bounded by said edges of said aperture by contact of portions of said pressure sensitive adhesive strip means one with another;
   e. deformable band means, secured to the exterior of said cap generally parallel with and extending past both ends of an edge portion of said aperture, where said edge portion at which said band means is attached is positioned circumferentially about said aperture midway between said vertices of said isoceles triangular Vs with said band extremities extending part way along said bases of said isoceles triangular V-shaped hinge portions, for retaining said container closed upon wrapping deformable band end portions about a portion of said cap after said aperture has been closed by folding said V-shaped hinge portions towards one another and first contacting said pressure sensitive interior adhesive strip surfaces within said cap and located proximate said aperture by adherence of said contacted portions of said pressure sensitive adhesive strip means one to another and then folding the portions of said cap, which were adjacent said edges which defined said aperture prior to contact of said interior pressure sensitive adhesive strip surfaces, at least one time over one another about said band along a line between said vertices of said isoceles triangular hinge members and towards said body of said container with said folding defining a reopenable and recloseable seal firstly encountered by contents of said container and said contacting pressure sensitive adhesive strip means defining another reopenable and recloseable seal serially encountered by contents of said container after encountering said firstly encountered seal upon said contents being removed from said container via said aperture.

2. Apparatus of claim 1 wherein said weakening lines of said hinge portions are perforate.

3. Apparatus of claim 1 wherein said hinge portions are defined by weakening lines formed in said cap portion.

4. Apparatus of claim 1 wherein band means is secured to the exterior of said cap at a position longitudinally displaced from said aperture.

5. Apparatus of claim 4 wherein said band means is secured to said cap at the central portion of said band means.

6. Apparatus of claim 5 wherein said band means is a ductile metal strip.

7. Apparatus of claim 1 wherein said longitudinally elongated body tapers from a smaller cross-sectional area at said closed base to a larger cross-sectional area at said mouth end.

8. Apparatus of claim 1 wherein said body and cap of said container are paper.

9. Apparatus of claim 1 wherein said Vs subtend angles greater than 90°.

10. An assembly of individual disposable sealably closeable reopenable and sealably recloseable double sealed substantially biodegradable containers, having successively next smaller containers of said assembly telescopingly housed within successively next larger containers of said assembly for serial individual use and removal of said containers from said assembly beginning with the most interior and therefore smallest container of said assembly, a manually operated closure portion of each container when actuated having first and second serially disposed seals separating the container contents from ambient air, each container comprising:
  1. a longitudinally elongated biodegradable rigid hollow paperboard body of smaller diameter at a closed base end and larger diameter at a circular mouth end opposite said base end;
  2. a closeable, reopenable and recloseable closure at said mouth end of said tapered cylindrical body, comprising:
     a. biodegradable longitudinally elongated foldable hollow cap portion continuously joining said circular mouth end of said cylindrical body about the circumference thereof to define a continuous circular joint therebetween;
     b. said cap portion extending longitudinally from said joint to define a generally rectangular aperture generally transverse to and symmetrically disposed about the longitudinal axis of said container, said aperture defining an open end of said cap portion remote said circular joint when said first and second seals are inoperative;
     c. said cap portion including a pair of flexible folding hinge portions extending longitudinally on opposite sides of said cap portion in isoceles triangular V-shapes having their triangular bases defined by cap-body juncture with vertices of said Vs at midpoints of respective opposite sides of said rectangular aperture, said flexible folding hinge portions being defined by weakening lines formed in said cap portion for folding of said cap portion therealong including along the legs of said "V", legs of said V-shapes stopping short of said circular joint, said longitudinally extending oppositely opposed surfaces of said cap defined by respective V-shaped flexible hinge portions being foldable at juncture thereof with said body by application of hand pressure to external surfaces thereof inwardly towards each other until reaching positions at which said surfaces are more perpendicular than parallel with respect to the longitudinal axis of said cap portion and at which interior strip surfaces of said cap bounded by said opposing edges of said rectangular aperture, which separate the aperture edges which include the vertices of the Vs, contact interior strip surfaces of said cap bounded by portions of respective edges of said rectangular aperture on either side of said vertices of the Vs, closing said aperture;
     d. pressure sensitive contact adhesive strip means extending circumferentially completely about the interior surface of said cap about said rectangular aperture, for releasably maintaining said cap portion closed and thereby defining said first seal by securing together said contacting (i) interior strip surfaces of said cap bounded by opposing edges of said rectangular aperture separating the aperture edges which include the vertices of the Vs, and (ii) interior strip surfaces of said cap bounded by portions of said respective edges of said rectangualr aperture on either side of respective vertices by contact of portions of said pressure sensitive adhesive strip means one with another as said hinge portions are folded towards one another in response to hand pressure applied to external surfaces thereof;
     e. deformable metal band means, a central portion thereof secured to the exterior of said cap generally parallel with and extending past both ends of one of said edges of said rectangular aperture which separates aperture edges containing said vertices of said Vs, for retaining said container closed upon wrapping deformable band end portions about a portion of said cap after said aperture has been closed by contacting (i) said interior pressure sensitive contact adhesive strip surfaces of said cap bounded by said opposing edges of said rectangular aperture separating the aperture edges which include the vertices of the Vs and (ii) said interior pressure sensitive contact adhesive strip surfaces of said cap bounded by said portions of said respective edges of said rectangular aperture on either side of said vertices and then hand folding the portion of said cap, which is adjacent said edges which defined said aperture prior to contact of said respective interior pressure sensitive adhesive strip surfaces, at least one time over one another, transverse to the longitudinal axis, about said band and towards said tapered cylindrical body of said container with said folding defining a reopenable and sealingly recloseable seal firstly encountered by contents of said container and said contacting pressure sensitive adhesive strip means defining another reopenable and sealingly recloseable seal serially encountered by contents of said container after encountering said firstly encountered seal upon said contents being removed from said container via said mouth.

11. An assembly of disposable sealably closeable reopenable and sealably recloseable double sealed substantially biodegradable containers, having successively next smaller containers of said assembly telescopingly housed within successively next larger containers of said assembly for serial individual use and removal of said containers from said assembly beginning with the most interior and therefore smallest container of said assembly, a manually operated closure portion of each container when actuated having first and second serially disposed openable and recloseable seals separating the container contents from ambient air, each container comprising:
  1. a longitudinally elongated biodegradable rigid hollow parallelepiped paperboard body including a closed base end and an open mouth end opposite said end;
  2. a closeable, reopenable and recloseable closure at said mouth end of said elongated parallelepiped body, comprising:
     a. a biodegradable longitudinally elongated foldable hollow cap portion continuously joining said mouth end of said body about the periphery thereof to define a continuous joint therebetween;

b. said cap portion extending longitudinally from said joint to define a generally rectangular aperture generally transverse to and symmetrically disposed about the longitudinal axis of said container, said aperture defining an open end of said cap portion remote said peripheral joint when said first and second seals are inoperative;

c. said cap portion including a pair of flexible folding hinge portions extending longitudinally on opposite sides of said cap portion in isoceles triangular V-shapes with vertices of said Vs at midpoints of respective opposite sides of said rectangular aperture, said flexible folding hinge portions being defined by weakening lines found in said cap portion for folding of said cap portion therealong including along the legs of said "V", legs of said V-shapes stopping short of said peripheral joint, said longitudinally extending oppositely opposed surfaces of said cap defined by respective V-shaped flexible hinge portions being foldable at the bases of said triangles by application of hand pressure to external surfaces of said hinge portions inwardly towards each other until reaching postions at which said surfaces are more perpendicular than parallel with respect to the longitudinal axis of said cap portion and at which interior strip surfaces of said cap bounded by said opposing edges of said rectangular aperture. which separate the aperture edges which include the vertices of the Vs, contact interior strip surfaces of cap bounded by portions of respective edges of said rectangular aperture on either side of said vertices of the Vs, closing said aperture;

d. pressure sensitive contact adhesive strip means extending circumferentially completely about the interior strip surfaces of said cap about said rectangular portion closed end thereby defining said first seal by securing together said contacting (i) interior strip surfaces of said cap bounded by opposing edges of said rectangular aperture separating the aperture edges which include the vertices of the Vs, and (ii) interior strip surfaces of said cap bounded by portions of said respective edges of said rectangular aperture on either side of respective vertices by contact of portions of said pressure sensitive adhesive strip means one with another as said hinge portions are folded towards one another in response to hand pressure applied to external surfaces thereof;

e. deformable metal band means, a central portion thereof secured to the exterior of said cap generally parallel with and extending past both ends of one of said edges of said rectangular aperture which separates aperture edges containing said vertices of said Vs, for retaining said container closed upon wrapping deformable band end portions about a portion of said cap after said aperture has been closed by containing (i) said interior pressure sensitive contact adhesive strip surfaces of said cap bounded by said opposing edges of said rectangular aperture separating the aperture edges which include the vertices of the Vs and (ii) said interior pressure sensitive contact adhesive strip surfaces of said cap bounded by said portions of said respective edges of said rectangular aperture on either side of said vertices and then folding the portion of said cap, which is adjacent said edges which defined said aperture prior to contact of said respective interior pressure sensitive adhesive strip surfaces, at least one time over one another, transverse to the longitudinal axis, about said band and towards said elongated parallelepiped body of said container with said folding defining a reopenable and sealingly recloseable seal firstly encountered by contents of said container and said contacting pressure sensitive adhesive strip means defining another reopenable and sealingly recloseable seal serially encountered by contents of said container after encountering said firstly encountered seal upon said contents being removed from said container via said mouth.

12. Apparatus of claim 11 wherein said band means is secured to the exterior of said cap at a longer side of said parallelepiped with end portions of said band means extending around corners of said parallelepiped, in facing contact with shorter sides of said parallelepiped.

13. Apparatus of claim 10 wherein said Vs subtend angles greater than 90°.

14. Apparatus of claim 11 where said Vs subtend angles greater than 90°.

15. Apparatus of claim 12 wherein said band means is longitudinally displaced from said aperture.

16. Apparatus of claim 13 wherein said weakening lines of said hinge portions are perforate.

17. Apparatus of claim 14 wherein said hinge portions are defined by weakening lines formed in said cap portion.

18. Apparatus of claim 16 wherein said body and cap of said container are paper.

19. Apparatus of claim 17 wherein said body and cap of said container are paper.

20. Apparatus of claim 14 wherein said longitudinally elongated body tapers from a smaller cross-sectional area at said closed base to a larger cross-sectional area at said mouth end.

* * * * *